Figure 1:
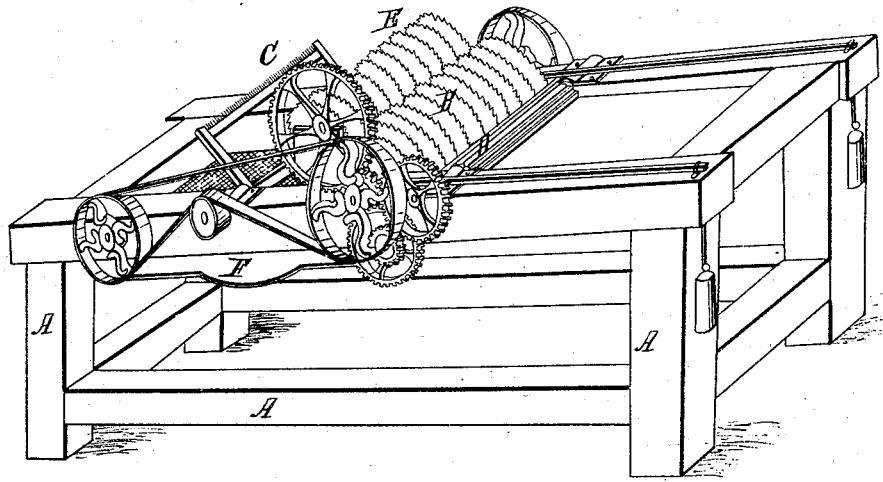
Figure 2:
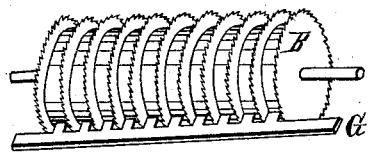

H. Clark & W. Albertson.
Rag Dusters.
N° 927.   Patented Sept. 19, 1838.

Witnesses:
D. T. Brainard
C. V. Stoddard

Inventors:
Henry Clark
William Albertson

UNITED STATES PATENT OFFICE.

HENRY CLARK AND WILLIAM ALBERTSON, OF NEW LONDON, CONNECTICUT.

MACHINE FOR TEARING AND DUSTING RAGS AND OTHER MATERIALS USED IN THE MANUFACTURE OF PAPER.

Specification of Letters Patent No. 927, dated September 19, 1838.

*To all whom it may concern:*

Be it known that we, HENRY CLARK and WILLIAM ALBERTSON, both of the town and county of New London and State of Connecticut, have invented a new and useful Machine for Tearing and Dusting Rags, Cotton-Waste, and other Materials for Making Paper; and we do hereby declare that the following is a full and exact description.

Take a frame of wood or iron of convenient size and dimensions, that which we use is about five feet long and two feet wide and two feet six inches high. Then take an iron shaft, its size to about one and a quarter inches square, long enough to extend across the frame, and so far beyond as to be convenient for gearing it on the outside. Onto this shaft place a number of circular saws, similar to those used in cotton gins, about half an inch apart. The saws we use are about ten inches in diameter, and the number commonly used twenty. Between the saws place circular blocks of wood in diameter about ¾ths of an inch less than the diameter of the saws and about half an inch thick or wide. The saws and blocks to be secured to their places on the shaft by keying them up with a collar of iron at each end of the shaft. The spaces or distances between the saws and the width of the blocks may be varied from the above and be increased or diminished according to the kind of work to be done. This shaft with the saws and blocks fitted as aforesaid is placed horizontally across the top of the frame and near its center. Take another shaft of iron of the same size with that first mentioned, fitted with two spiders, one near each end, with four arms to each spider, about 8 inches in length, the arms on one end of the shaft to be connected with the corresponding arms on the other end by a rib of wood about one and ⅛th inches wide and one inch thick. On the outer or upper side of the four ribs attach brushes of bristles or leather extending the whole length of the rib, and on the under or inner side of the rib secure fans made of wood about 4 inches wide and half an inch thick to extend the length of the rib. This shaft with the brushes and fans is placed on the same frame with the saws, and so near to them that when in motion, the brushes will act on the teeth of the saws to brush them. On the other side of the shaft containing the saws and in front of it place two feed rollers such as are used in cotton pickers each about two inches in diameter with an apron similar to those used in cotton pickers to receive the material and convey it to the rollers, the feed rollers to be placed across the frame and so near to the saws that they will receive the material from them.

Under the saws and brushes place a wire screen with meshes about ⅛th of an inch, the screen to be secured to the frame at a point about one inch below the saws and so near to the brushes that when the machine is in motion they will touch it, the screen to extend across the frame and to be about two feet in length. At the farther end of the screen place an apron of wood of the width of the frame and to extend to the farther end of it. At the other end of the screen and under the saws a comb is attached with iron teeth of sufficient length to extend from the screen to within one eighth of an inch of the circular blocks between the saws, and of sufficient thickness or width to fill the space between the saws except about ⅛th of an inch on each side of the teeth which is represented in the drawing Figure No. 2 marked B G.

For ordinary purposes the foregoing is sufficient to accomplish the object desired in tearing and dusting the rags and other materials, but for some kinds of work it may be found useful to attach another shaft with saws above the first named shaft and so near to the brushes that they will act upon both shafts of saws at the same time, the upper shaft to revolve with much less velocity than the lower shaft of saws, as arranged by us with about one fourth the velocity of the lower shafts.

A covering of wood or some other material should be placed over the saws and brushes.

Motion is communicated to the shafts containing the saws, and the brushes and fans and feed rollers by bands or wheels and cogs in common form. They may be moved, by hand by crank, but water or steam power is best.

The lower feed roller and the lower shaft of saws are to revolve in the same direction, the shaft with the brushes and fans to perform its revolutions in a direction opposite to the saws.

The machine is made to move in such manner as that the shaft with the brushes and fans will revolve about 500 revolutions in a minute, the shaft with the saws about 150 revolutions in a minute and the feed rollers about 15 revolutions in a minute and with that or near that relative velocity, by these motions and combinations of parts of the rags other material are torn, dusted and prepared for the engine.

The annexed drawings present three views of the machine, the first a side view showing the gearing, the second a side view showing the whirl by which the machine is driven and the third a top view showing the different parts.

In the first view letters A designate the frame, letter B the circular saws, letter C the brushes and fans, letter D the feed rollers, letter E the additional cylinder of saws and letter F the screen, and the same letters designate the same parts on the other views and Fig. No. 2 represents the comb.

We do not claim as our invention the shaft with the circular saws and blocks or any of its parts, nor the shaft with the brushes and fans nor any of its parts, nor the feed rollers and apron nor the screen nor the comb nor in short any several part of the machine taken by itself; but We do claim as our invention—

The aforesaid combination of the shaft and circular saws and blocks when combined with the combined fans and brushes and the feed rollers and apron and the screen and comb. By these combinations of parts, with motion communicated in the manner herein specified, the rags are torn, dusted and prepared for the engine.

HENRY CLARK,
WILLIAM ALBERTSON.

Witnesses:
E. V. STODDARD,
W. P. CLEAVELAND, Jun.